(12) United States Patent
Haig (10) Patent No.: US 6,773,031 B2
(45) Date of Patent: Aug. 10, 2004

(54) POP-UP VEHICLE OCCUPANT PROTECTION DEVICE

(75) Inventor: Andrew M. Haig, Ferndale, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/015,102

(22) Filed: Dec. 11, 2001

(65) Prior Publication Data
US 2003/0107209 A1 Jun. 12, 2003

(51) Int. Cl.[7] .......................... B60R 21/08; B60R 21/22
(52) U.S. Cl. ..................... 280/749; 280/730.2; 280/753
(58) Field of Search ............................ 280/730.2, 749, 280/730.1, 753

(56) References Cited

U.S. PATENT DOCUMENTS

| | | | |
|---|---|---|---|
| 2,477,933 A | * 8/1949 | Labser ........................ | 280/749 |
| 2,806,737 A | * 9/1957 | Maxwell ................... | 280/730.1 |
| 5,316,336 A | 5/1994 | Taguchi et al. | |
| 5,318,145 A | 6/1994 | Vollmer | |
| 5,322,322 A | 6/1994 | Bark et al. | |
| 5,462,308 A | * 10/1995 | Seki et al. ................ | 280/730.2 |
| 5,480,181 A | 1/1996 | Bark et al. | |
| 5,588,672 A | 12/1996 | Karlow et al. | |
| 5,660,414 A | 8/1997 | Karlow et al. | |
| 5,707,075 A | * 1/1998 | Kraft et al. .............. | 280/730.2 |
| 5,788,270 A | * 8/1998 | Haland et al. ........... | 280/730.2 |
| 5,865,462 A | 2/1999 | Robins et al. | |
| 5,979,932 A | 11/1999 | Jourdaine et al. | |
| 5,984,348 A | 11/1999 | Specht et al. | |

FOREIGN PATENT DOCUMENTS

DE    19547494 A1 * 7/1997  ........... B60R/21/22

OTHER PUBLICATIONS

Partial English translation of DE 195 47 494.

* cited by examiner

Primary Examiner—Peter C. English
(74) Attorney, Agent, or Firm—Tarolli, Sundheim, Covell & Tummino L.L.P.

(57) ABSTRACT

Apparatus (10) helps protect an occupant of a vehicle (12) that has a side structure (20). The apparatus (10) includes a vehicle occupant protection device (14) that has a lower edge (70) connected to the side structure (20). The protection device (14) is deployable from a stored position located in the side structure (20) to a deployed position in which at least a portion of the protection device is positioned above a sill (26) of the side structure and adjacent the vehicle occupant. A deployment device (16) is fixedly connected to the side structure (20) and includes an elongated rigid deployment member (52) connected to the protection device (14). The deployment device (16) is actuatable from a stored position to a deployed position in which the deployment member projects above the sill (26). The deployment member (52) moves the protection device (14) from the stored position to the deployed position when the deployment device (16) is actuated. The apparatus (10) also includes a portion (64) for locking the deployment member (52) in the deployed position.

2 Claims, 9 Drawing Sheets

POP-UP VEHICLE OCCUPANT PROTECTION DEVICE

FIELD OF THE INVENTION

The present invention relates to a vehicle occupant protection device for helping to protect a vehicle occupant in the event of a side impact to the vehicle and/or a vehicle rollover. In particular, the present invention relates to a vehicle occupant protection device that is deployed in an upward direction from the side structure of a vehicle, such as a convertible automobile, that lacks structure above the vehicle doors that is suitable for supporting the protection device.

BACKGROUND OF THE INVENTION

It is known to provide a vehicle occupant protection device to help protect a vehicle occupant in the event of a vehicle collision. One particular type of vehicle occupant protection device is a side curtain. The known side curtains typically have a stored position adjacent the intersection of the side structure of the vehicle and the vehicle roof. The side curtain is deployed away from the vehicle roof downward inside the passenger compartment to a deployed position between a vehicle occupant and the side structure of the vehicle in the event of a side impact or rollover.

SUMMARY OF THE INVENTION

The present invention relates to an apparatus for helping to protect an occupant of a vehicle that has a side structure. The apparatus includes a vehicle occupant protection device that has a lower edge connected to the side structure. The vehicle occupant protection device is deployable from a stored position in which the vehicle occupant protection device is located in the side structure to a deployed position in which at least a portion of the vehicle occupant protection device is positioned above a sill of the side structure and adjacent the vehicle occupant.

A deployment device is fixedly connected to the side structure and includes an elongated rigid deployment member. The deployment member is connected to the vehicle occupant protection device adjacent an upper edge of the vehicle occupant protection device. The deployment device is actuatable from a stored position in which the deployment member is positioned inside the side structure to a deployed position in which the deployment member projects above the sill. The deployment member helps move the vehicle occupant protection device from the stored position to the deployed position when the deployment device is actuated. The apparatus also includes means for locking the deployment member in the deployed position.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF PREFERRED EMBODIMENTS

As representative of the present invention, FIGS. 1–4 illustrate an apparatus 10 for helping to protect an occupant of a vehicle 12. The apparatus 10 may be incorporated in a vehicle 12 having a variety of constructions. The apparatus 10, however, is especially suited for use in a vehicle 12 that has a roof that is movable or removable, such as a convertible automobile, because such vehicles often lack structure suitable for supporting the apparatus in the area of the vehicle roof. The vehicle 12 illustrated in FIGS. 1–4 is a two-door convertible automobile.

Figure 1:
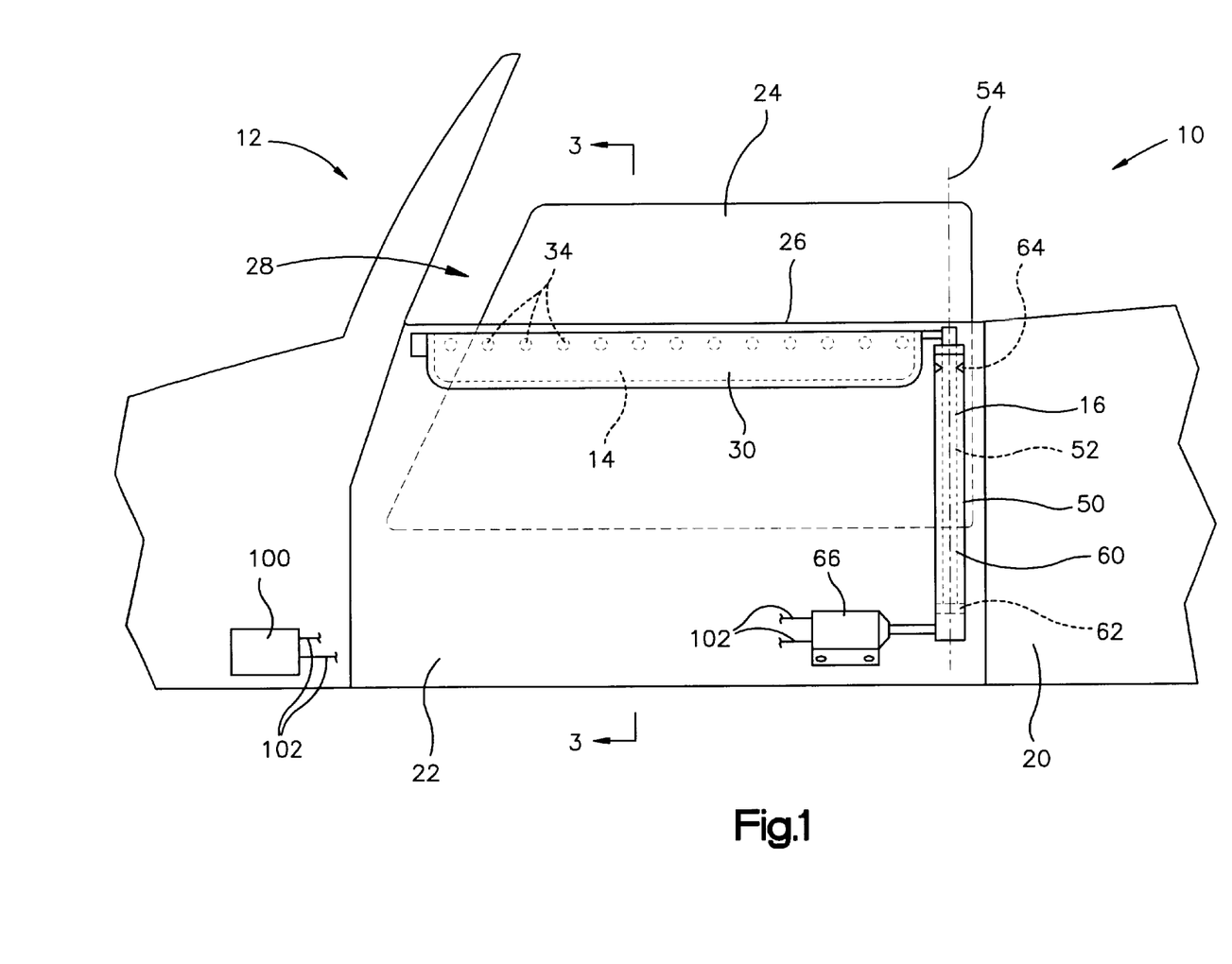
FIG. 1 is a schematic view of an apparatus for helping to protect a vehicle occupant illustrating the apparatus in an undeployed condition, according to a first embodiment of the invention.
Figure 2:
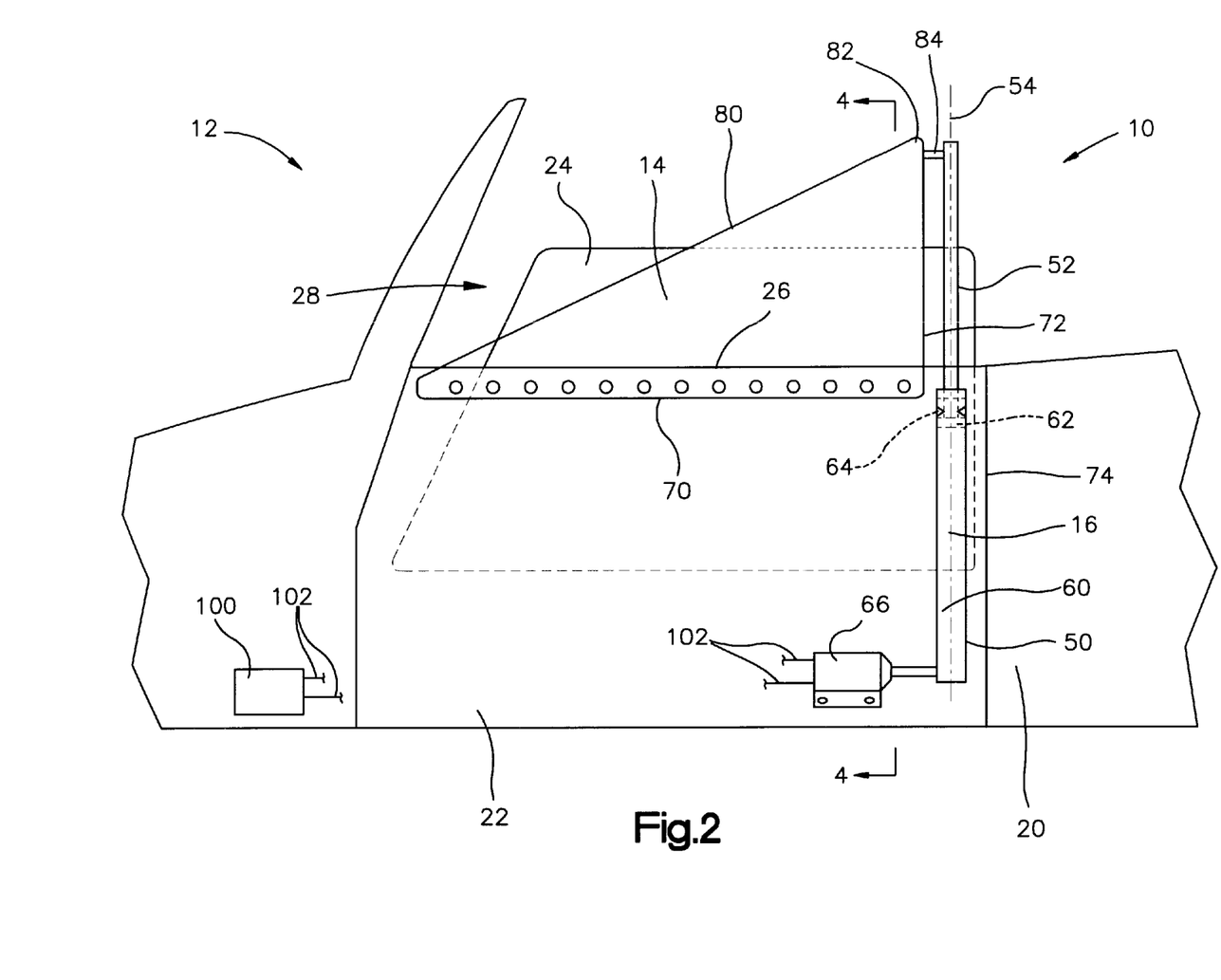
FIG. 2 is a schematic view of the apparatus of FIG. 1 in a deployed condition.
Figure 3:
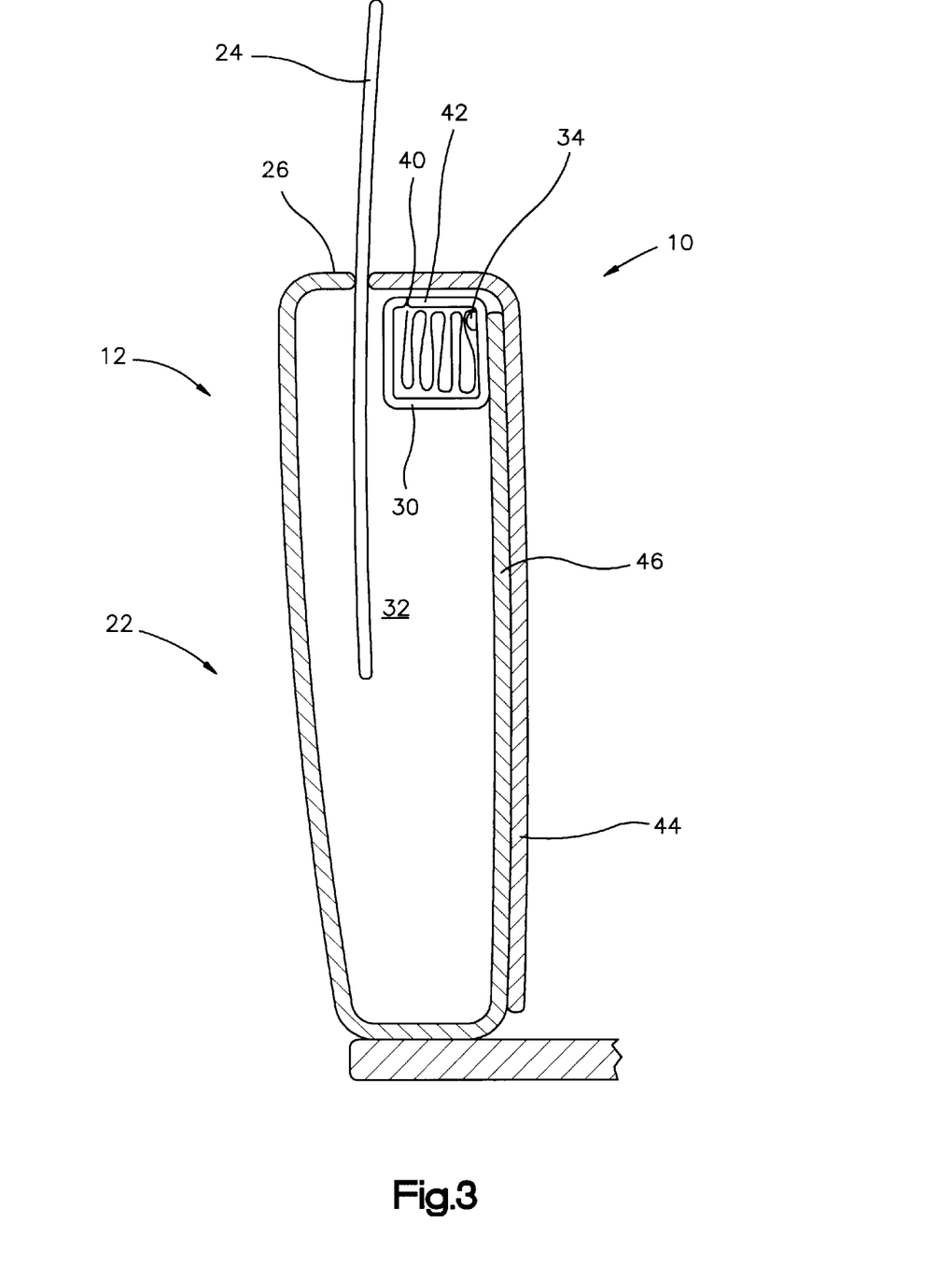
FIG. 3 is a sectional view of the apparatus taken generally along line 3—3 in FIG. 1.
Figure 4:
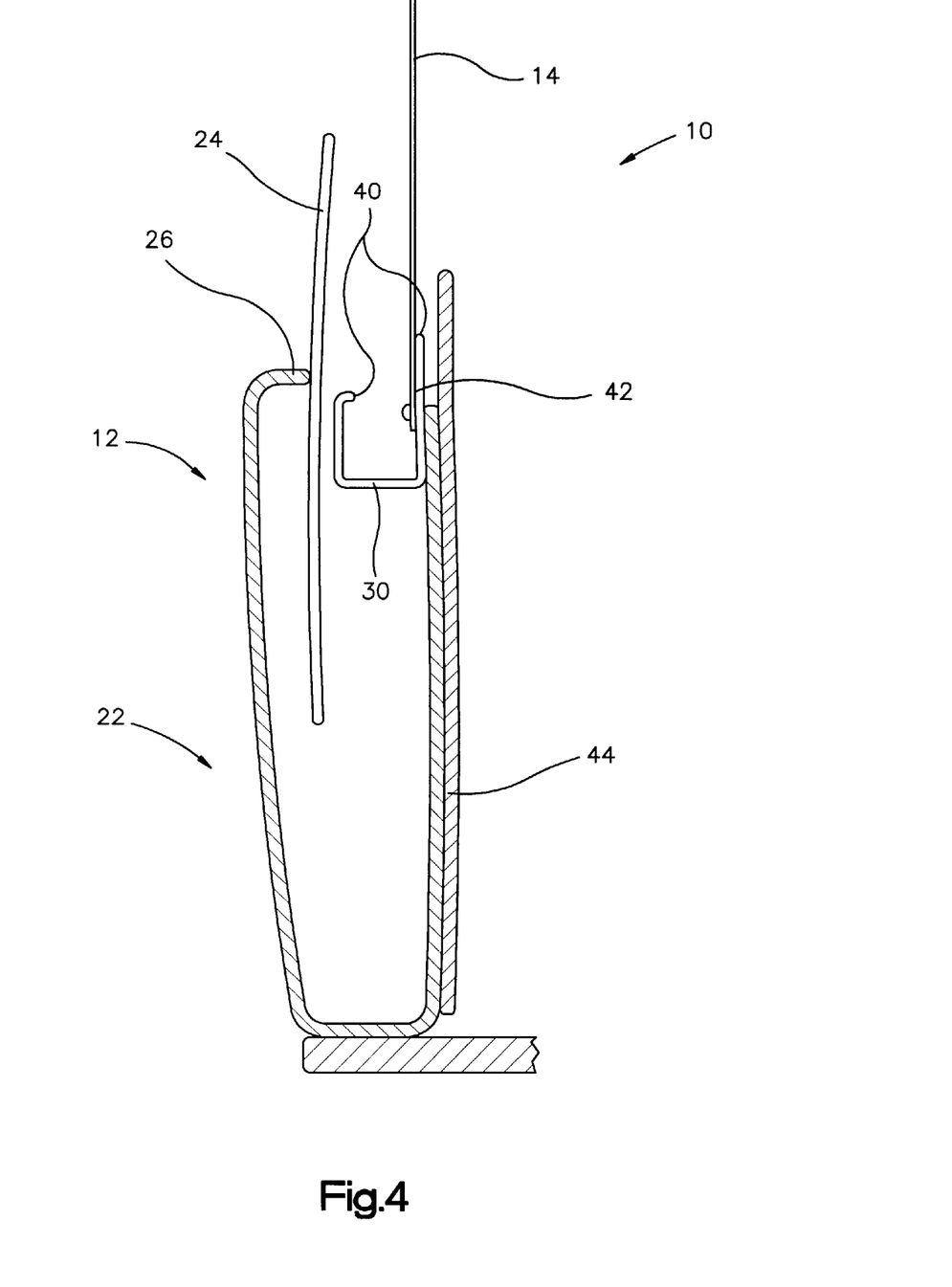
FIG. 4 is a sectional view of the apparatus taken generally along line 4—4 in FIG. 2.

The apparatus 10 is actuatable from a stored position, illustrated in FIGS. 1 and 3, to a deployed position, illustrated in FIGS. 2 and 4. As shown in FIGS. 1 and 2, the apparatus 10 includes a vehicle occupant protection device, in the form of a side curtain 14, and a deployment device 16. The side curtain 14 of the embodiment illustrated in FIGS. 1–4 is a non-inflatable side curtain.

The side curtain 14 and the deployment device 16 are mounted in the side structure 20 of the vehicle 12. In the embodiments illustrated in FIGS. 1–4, the side curtain 14 and the deployment device 16 are mounted in a side door 22 of the vehicle 12. The side curtain 14 could, however, be mounted in an alternative location. For example, in the two-door convertible vehicle 12 of FIGS. 1–4, the side curtain 14 and the deployment device 16 could be mounted in the side structure 20 rearward of the side door 22 adjacent a rear seat (not shown) of the vehicle.

The side door 22 includes a side window 24 that is operable between an opened or "down" position and a closed or "up" position. In the embodiment illustrated in FIGS. 1–4, the window 24 is illustrated at a position between the opened and closed positions. The side door 22 also includes a window opening 28 (FIGS. 1 and 2) into which the window 24 may extend. The window opening 28 is partially defined by a sill 26 which forms a part of the vehicle side structure 20. The sill 26 helps define a lower edge of the window opening 28. As illustrated in FIGS. 1–4, the sill 26 may extend rearward beyond the rear extent of the side door 22 to a position adjacent the rear seat of the vehicle 12. The sill 26 thus helps define the upper extent of the side structure 20 adjacent an occupant (not shown) of the vehicle 12.

The apparatus 10 of the present invention may be incorporated in side doors 22 having a variety of configurations. Referring to FIGS. 1 and 3, when the apparatus 10 is in the stored position, the side curtain 14 is stored in a housing 30 positioned in an interior portion 32 of the side door 22. In the embodiment illustrated in FIGS. 1 and 3, the side curtain 14 is folded into the stored position in the housing 30. The side curtain 14, however, could be placed in the stored position in any desired manner, such as by rolling the curtain or by a combination of folding and rolling the curtain.

When the apparatus 10 is in the stored position, the housing 30 and the side curtain 14 have a generally elongated configuration extending adjacent or near the sill 26. The side curtain 14 and the housing 30 are connected to the side door 22 by suitable fastening means 34, such as screws, bolts, rivets, etc. Referring to FIG. 3, the housing 30 includes a tear seam 40 that extends longitudinally along the length of the housing 30 on an upper side wall 42 of the housing. A door panel 44 overlies an inner panel 46 of the side door 22 and may help to conceal the side curtain 14 and housing 30 in the interior 32 of the side door.

The deployment device 16 includes a housing or base portion 50 and a deployment member 52. The base portion 50 is fixedly connected to the side door 22 by means (not shown), such as fasteners, welding, adhesives, etc., which provides rigid support for the deployment device 16. The deployment member 52 is generally elongated and constructed of a rigid material, such as metal. The deployment member 52 has a central longitudinal axis 54 and is moveable in an axial direction parallel to the axis relative to the base portion 50.

Those skilled in the art will recognize that the deployment device 16 may have a variety of configurations suitable to cause movement of the deployment member 52 in the upward direction. For example, the deployment device 16 may comprise a hydraulic actuator, pneumatic actuator, electromechanical actuator, electromagnetic actuator, pyrotechnic actuator, etc.

In the embodiment illustrated in FIGS. 1–4, the deployment device 16 comprises a cylinder 60 and a piston 62 movable in the cylinder in a direction parallel to the axis 54. The deployment device 16 further comprises a fluid source 66 operatively connected to the cylinder 60. The fluid source 66 is actuatable to provide pressurized fluid, preferably a pressurized gas, to the cylinder to effectuate movement of the piston 62 in a generally upward direction along the axis 54 in the cylinder. The deployment member 52 is connected to the piston 62 and is moveable with the piston in the upward direction along the axis 54. By "generally upward direction" it is meant that the deployment member 52 is moveable in an upward direction with respect to the vehicle 12 as viewed in FIGS. 1–4.

The deployment device 16 is actuatable from a stored position in the side door 22 to a deployed position in which the deployment member 52 extends above the sill 26. The deployment device 16 also includes locking means 64 for locking the deployment member 52 in the deployed position. Preferably, the locking means 64 is adapted to block downward movement of the deployment member 52 at the farthest position reached by the deployment member when the deployment member is moved in the upward direction.

Figure 5:
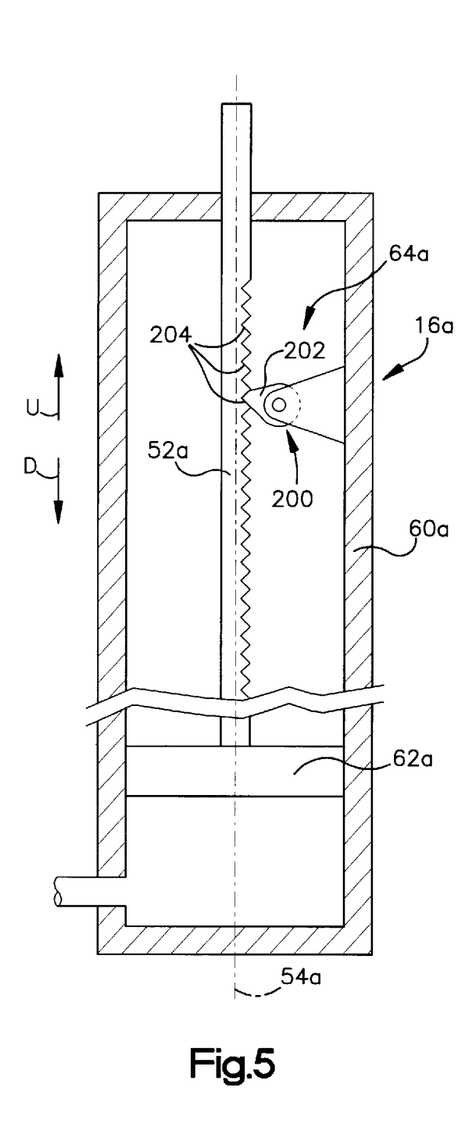
FIGS. 5 and 6 are sectional views of a portion of the apparatuses of FIGS. 1–8.

The locking means 64 may have any configuration operative to block downward movement of the deployment member 52 at the upwardmost position reached by the deployment member when moved in the upward direction. FIG. 5 illustrates a first example embodiment of the deployment device 16a fit with a first locking means 64a. The deployment device 16a of FIG. 5 is similar to the deployment device 16 first embodiment of the invention illustrated in FIGS. 1–4. Accordingly, numerals similar to those of FIGS. 1–4 will be utilized in FIG. 5 to identify similar components, the suffix letter "a" being associated with the numerals of FIG. 5 to avoid confusion.

In the first example embodiment of the deployment device 16a illustrated in FIG. 5, the locking means 64a comprises a ratchet mechanism 200. The ratchet mechanism 200 includes a pawl 202 pivotally mounted to the cylinder 60a and teeth 204 formed on an outer surface of the deployment member 52a. The ratchet mechanism 200 includes a biasing member (not shown), such as a spring, that biases the pawl 202 to pivot in a counterclockwise direction as viewed in FIG. 5 into abutting engagement with the teeth 204.

When the deployment member 52a moves in the upward direction, indicated generally by the arrow labeled "U", along the axis 54a, the teeth 204 urge the pawl 202 to pivot in a clockwise direction as viewed in FIG. 5. This pivotal movement of the pawl 202 allows the teeth 204 to slide over the pawl, thus permitting the deployment member 52a to move in the upward direction. When the deployment member 52a moves in the downward direction, indicated generally by the arrow labeled "D", the pawl 202 is urged into engagement with the teeth 204, which blocks movement of the deployment member in the downward direction.

Figure 6:
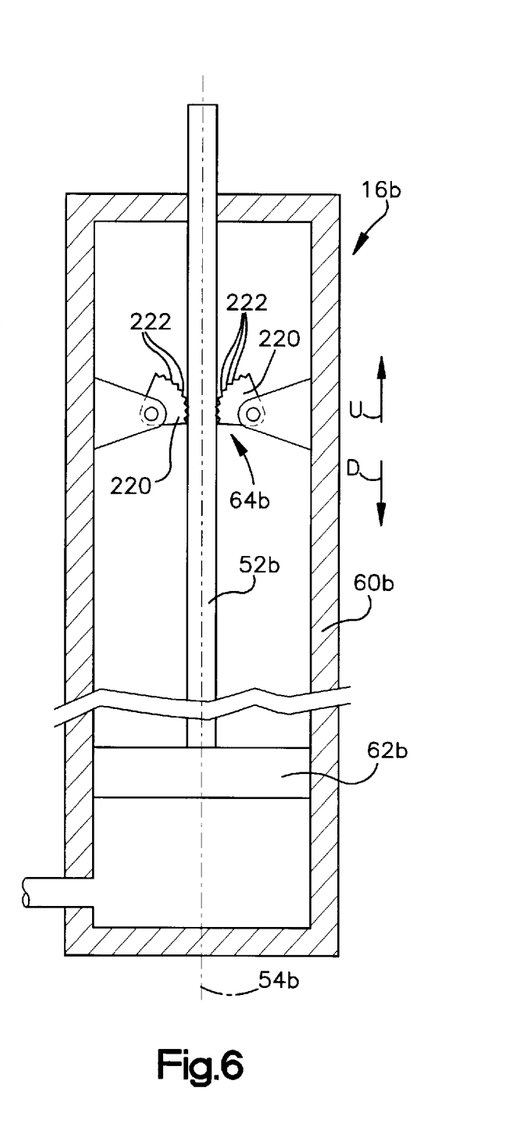

FIG. 6 illustrates a second example embodiment of a deployment device 16b including a second locking means 64b. The deployment device 16b of FIG. 6 is similar to the deployment device 16 first embodiment of the invention illustrated in FIGS. 1–4. Accordingly, numerals similar to those of FIGS. 1–4 will be utilized in FIG. 6 to identify similar components, the suffix letter "b" being associated with the numerals of FIG. 6 to avoid confusion.

In the second example embodiment of the deployment device 16b illustrated in FIG. 6, the locking means 64b comprises a pair of opposing jaws 220 positioned on opposite sides of the deployment member 52b. The jaws 220 are pivotally mounted to the cylinder 60b. Each of the jaws 220 has a surface that includes a plurality of teeth 222. The jaws 220 are arranged such that the teeth 222 of each jaw are presented toward the deployment member 52b and toward each other. Each of the jaws 220 includes biasing means (not shown), such as a spring, that biases the jaws towards each other and towards the deployment member 52. The teeth 222 of each jaw 220 are thus biased into abutting engagement with the deployment member 52b.

As the deployment member 52b moves in the upward direction, the jaws 220 are urged away from the deployment member and away from each other by the movement of the deployment member. This allows the deployment member 52b to slide over the teeth 222 and move in the upward direction between the jaws 220. Movement of the deployment member 52b in the downward direction urges the jaws 220 towards the deployment member 52b and towards each other. This causes the jaws 220 to clamp onto the deployment member 52b, which blocks movement of the deployment member in the downward direction.

Those skilled in the art will recognize that the deployment device 16 (FIGS. 1–4) may have alternative configurations operative to block downward movement of the deployment member 52 at the upwardmost position reached by the deployment member when deployed. For example, the fluid source 66 may be adapted to maintain fluid pressure in the cylinder 60 after the deployment device 16 is actuated in order to help block downward movement of the deployment member 52.

The side curtain 14 is preferably constructed of a high-strength fabric, such as nylon. The side curtain 14 may include a single layer of material or multiple layers of material. Alternative fabrics and other materials, such as elastomers, plastic films, or combinations thereof, may also be used to construct the side curtain 14.

Referring to FIG. 2, the side curtain 14 has a generally triangular configuration. The side curtain 14 could, however, have a configuration of an alternative shape. The side curtain 14 includes a lower edge 70 connected to the side door 22 adjacent or near the sill 26. A rear edge 72 of the side curtain 14 extends upward from a rear end of the lower edge 70 and is positioned near a rear edge 74 of the side door 22. An upper edge 80 of the side curtain 14 extends from an upper end of the rear edge 72 to a forward end of the lower edge 70.

The side curtain 14 is connected to the deployment member 52 at a location 82, adjacent or near the intersection of the upper edge 80 and the rear edge 72 by connecting means 84, such as a strap or tether. The side curtain 14 could also be connected to the deployment member 52 at any other location along the rear edge 72 of the curtain. For example, the side curtain 14 could include a plurality of connecting means 84, spaced along the rear edge 72 of the curtain, for connecting the curtain to the deployment member 52. Alternatively, the side curtain 14 could include a sleeve (not shown) extending along the entire rear edge 72 or any portion of the rear edge for receiving the deployment member 52 in order to connect the curtain to the deployment member.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the fluid source 66 in response to the sensing of a side impact or a vehicle rollover. In the event of a rollover of the vehicle 12 or a side impact to the vehicle for which deployment of the side curtain 14 is desired, the sensor mechanism 100 provides an electrical signal over lead wires 102 to the fluid source 66. The electrical signal causes the fluid source 66 to be actuated in a known manner. The fluid source 66 discharges pressurized fluid into the cylinder 60.

The piston 62 urges the deployment member 52 in the upward direction towards the deployed position under the pressure of the fluid from the fluid source 66. The deployment member 52 pulls the side curtain 14 via the connecting means 84. The housing 30 opens along the tear seam 40 under the force of the deploying curtain and the side curtain 14 is deployed in a generally upward direction into the position illustrated in FIGS. 2 and 4.

The side curtain 14, when deployed, extends along the side door 22 of the vehicle 12 and is positioned between the side window 24 and any occupant (not shown) of the vehicle. As illustrated in FIGS. 2 and 4, when the side curtain 14 is in the deployed condition, the curtain extends generally vertically above the sill 26 and is positioned overlying the window opening 28.

The deployment member 52, when deployed, extends upward in a generally vertical direction from the side door 22. The deployment member 52 could, however, extend at an angle from the side door 22. The locking means 64 locks the deployment member 52 in the deployed position of FIGS. 2 and 4. When the deployment member 52 is in the deployed position, the end of the deployment member connected to the side curtain 14 is positioned above the sill 26.

The side curtain 14, when deployed, helps to protect a vehicle occupant in the event of a vehicle rollover or a side impact to the vehicle 12. The side curtain 14, when deployed, helps to absorb the energy of impacts with the curtain and helps to distribute the impact energy over a large area of the curtain. The deployment member 52, being locked in the deployed position by the locking means 64, helps to maintain the side curtain 14 in the deployed position throughout the duration of a side impact to the vehicle 12 or a vehicle rollover. As a feature of the present invention, the rigid material construction of the deployment member 52 and the rigid connection between the deployment device 16 and the vehicle 12 help provide rigid support for the side curtain 14. This helps allow the side curtain 14 to absorb and distribute the impact energy.

Figure 7:
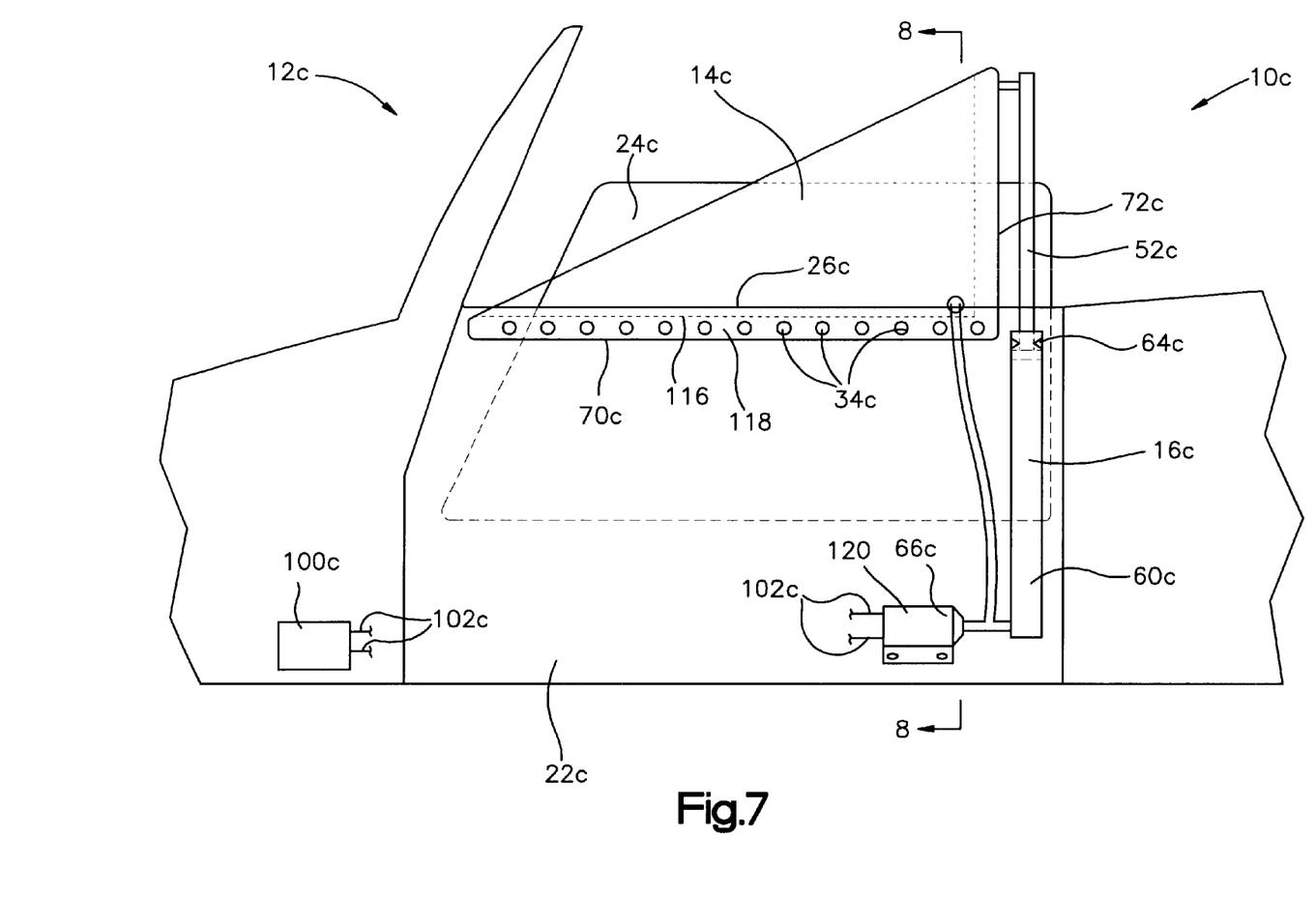
FIG. 7 is a schematic view of an apparatus for helping to protect a vehicle occupant illustrating the apparatus in a deployed condition, according to a second embodiment of the invention.
Figure 8:
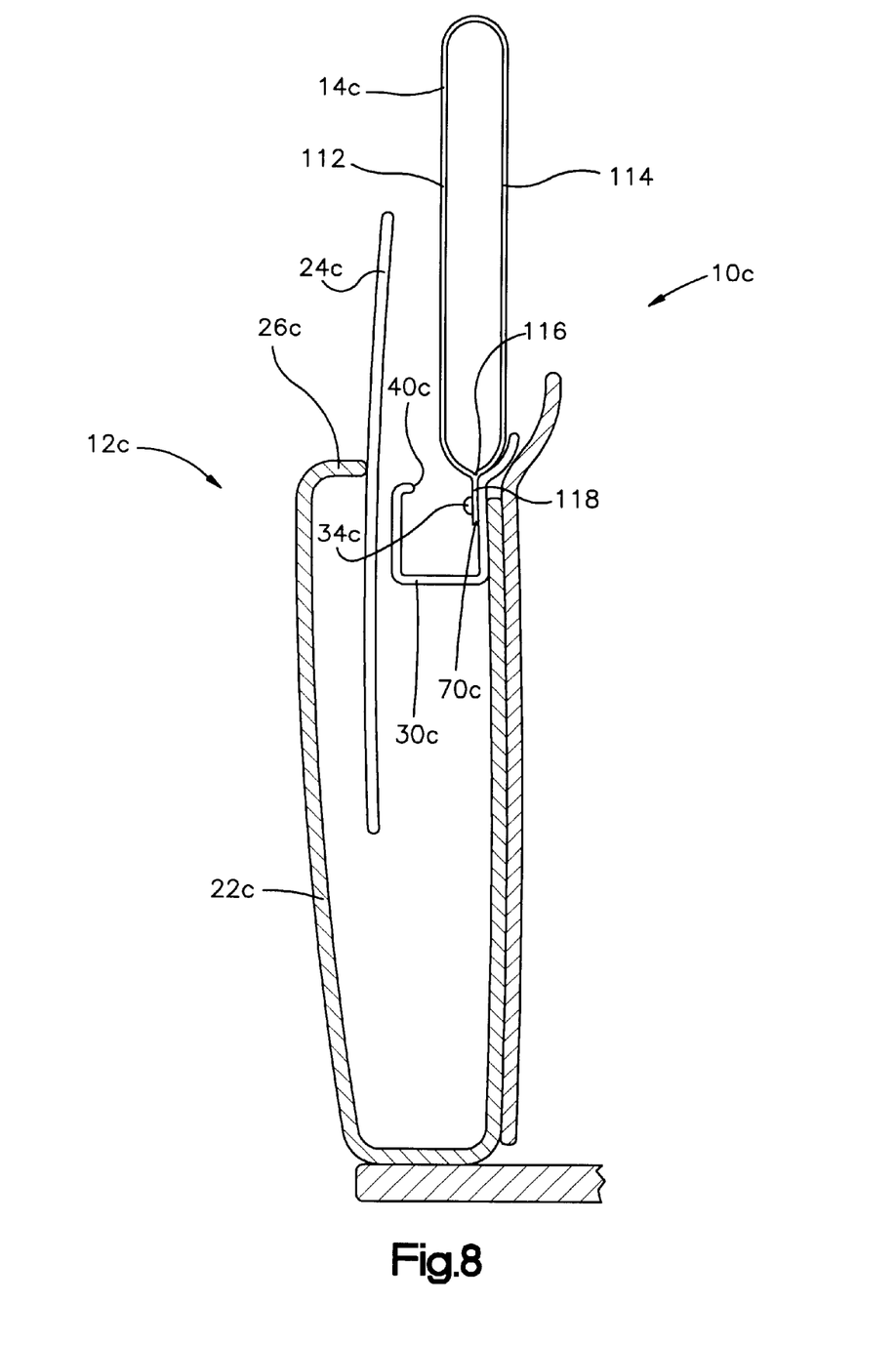
FIG. 8 is a sectional view of the apparatus taken generally along line 8—8 in FIG. 7.

A second embodiment of the present invention is illustrated in FIGS. 7 and 8. The second embodiment of the invention is similar to the first embodiment of the invention illustrated in FIGS. 1–4. Accordingly, numerals similar to those of FIGS. 1–4 will be utilized in FIGS. 7 and 8 to identify similar components, the suffix letter "c" being associated with the numerals of FIGS. 7 and 8 to avoid confusion. The apparatus 10c of the second embodiment is identical to the apparatus 10 (FIGS. 1–4), except that the side curtain 14c (FIGS. 7 and 8) of the second embodiment has a different configuration than the side curtain 14 (FIGS. 1–4) of the first embodiment.

As illustrated in FIGS. 7 and 8, the side curtain 14c has a generally triangular configuration similar to the side curtain 14 (FIGS. 1–4) of the present invention. The side curtain 14c (FIGS. 7 and 8) could, however, have a configuration of an alternative shape. The side curtain 14c of the second embodiment is an inflatable side curtain.

The side curtain 14c (FIG. 8) includes first and second panels 112 and 114 that are arranged in an overlying manner. In the embodiment illustrated in FIGS. 7 and 8, overlapping portions of the first and second panels 112 and 114 are interconnected by means, such as stitching, along at least a portion of a perimeter connection 116 of the side curtain 14c to form an inflatable volume of the curtain. Alternative means, such as ultrasonic bonding, heat welding, or adhesive bonding, could also be used to interconnect the first and second panels 112 and 114.

In the embodiment illustrated in FIGS. 7 and 8, the perimeter connection extends along the lower edge 70c and the rear edge 72c of the side curtain 14c. The first and second panels 112 and 114 could also be interconnected at desired locations within the perimeter 116 to form inflatable chambers (not shown) of the side curtain 14c. The interconnected first and second panels 112 and 114 form a non-inflatable portion 118 of the curtain that extends along the lower edge 70c of the side curtain 14c. The non-inflatable portion 118 is connected to the side door 22c adjacent the sill 26c by the fastening means 34c.

As illustrated in FIG. 8 the side curtain 14c is formed from a sheet of material that is folded over to form the overlying first and second panels 112 and 114. It will be recognized by those skilled in the art, however, that the side curtain 14c could have alternative constructions. For example, the first and second panels 112 and 114 could be formed from separate sheets of material arranged in an overlying manner and secured together by stitching, ultrasonic bonding, heat welding, or adhesive bonding that extends around the entire perimeter 116 of the panels to form the side curtain 14c. As a further alternative, the side curtain 14c could be woven as a single piece of material.

The first and second panels 112 and 114 are preferably constructed of a fabric, such as nylon, that may be coated with a gas impermeable material, such as urethane or silicone. The side curtain 14c thus may have a substantially gas-tight construction. Other materials, such as elastomers, plastic films, or combinations thereof, may also be used to construct the side curtain 14c. The first and second panels 112 and 114 may also be formed of single or multi-layered sheets of material.

The apparatus 10c of the second embodiment includes an inflation fluid source 120 for inflating the side curtain 14c. The inflation fluid source 120 contains a stored quantity of pressurized inflation fluid (not shown) in the form of a gas to inflate the side curtain 14c. The inflation fluid source 120 alternatively could contain a combination of pressurized inflation fluid and ignitable material for heating the inflation fluid, or could be a pyrotechnic inflator that uses the combustion of gas-generating material to generate inflation fluid. As a further alternative, the inflation fluid source 120 could be of any suitable type or construction for supplying a medium for inflating the side curtain 14c.

As illustrated in FIG. 7, the inflation fluid source 120 may be the fluid source 66c. The fluid source 66c may thus provide pressurized fluid to the deployment device 16c for effectuating movement of the deployment member 52c and also provide pressurized fluid to the side curtain 14c to inflate the curtain. Those skilled in the art, however, will recognize that the inflation fluid source 120 may be separate from the fluid source 66c.

Upon sensing a side impact or a vehicle rollover for which deployment of the side curtain 14c is desired, the sensor mechanism 100c actuates the fluid source 66c. The sensor mechanism 100c causes actuation of the fluid source 66c via the lead wires 102c. The fluid source 66c discharges pressurized fluid into the cylinder 60c to actuate the deployment device 16c and into the side curtain 14c to inflate the curtain.

Upon actuation of the deployment device 16c, the deployment member 52c pulls the side curtain 14c in the upward direction. The side curtain 14c is also urged in the upward direction under the force of the inflation fluid inflating the curtain. The housing 30c (FIG. 8) opens along the tear seam 40c under the force of the deploying side curtain 14c, and the curtain is deployed in a generally upward direction into the position illustrated in FIGS. 7 and 8.

The side curtain 14c, when deployed, extends along the side door 22c of the vehicle 12c and is positioned between the side window 24c and any occupant (not shown) of the vehicle. As illustrated in FIGS. 7 and 8, when the side curtain 14c is in the deployed condition, the curtain extends generally vertically above the sill 26c.

The deployment member 52c, when deployed, extends upward in a generally vertical direction from the side door 22c. The deployment member 52c could, however, extend at an angle from the side door 22c. The locking means 64c locks the deployment member 52c in the deployed position of FIGS. 7 and 8. When the deployment member 52c is in the deployed position, the end of the deployment member connected to the side curtain 14c is positioned above the sill 26c.

The side curtain 14c, when deployed, helps to protect a vehicle occupant in the event of a vehicle rollover or a side impact to the vehicle 12c. The inflated side curtain 14c helps to absorb the energy of impacts with the curtain and helps to distribute the impact energy over a large area of the curtain. The deployment member 52c, being locked in the deployed position by the locking means 64c, helps to maintain the side curtain 14c in the deployed position throughout the duration of a side impact to the vehicle 12c or a vehicle rollover. The rigid material construction of the deployment member 52c and the rigid connection between the deployment member and the vehicle 12c help provide rigid support for the side curtain 14c. This helps allow the side curtain 14c to absorb and distribute the impact energy.

Figure 9:
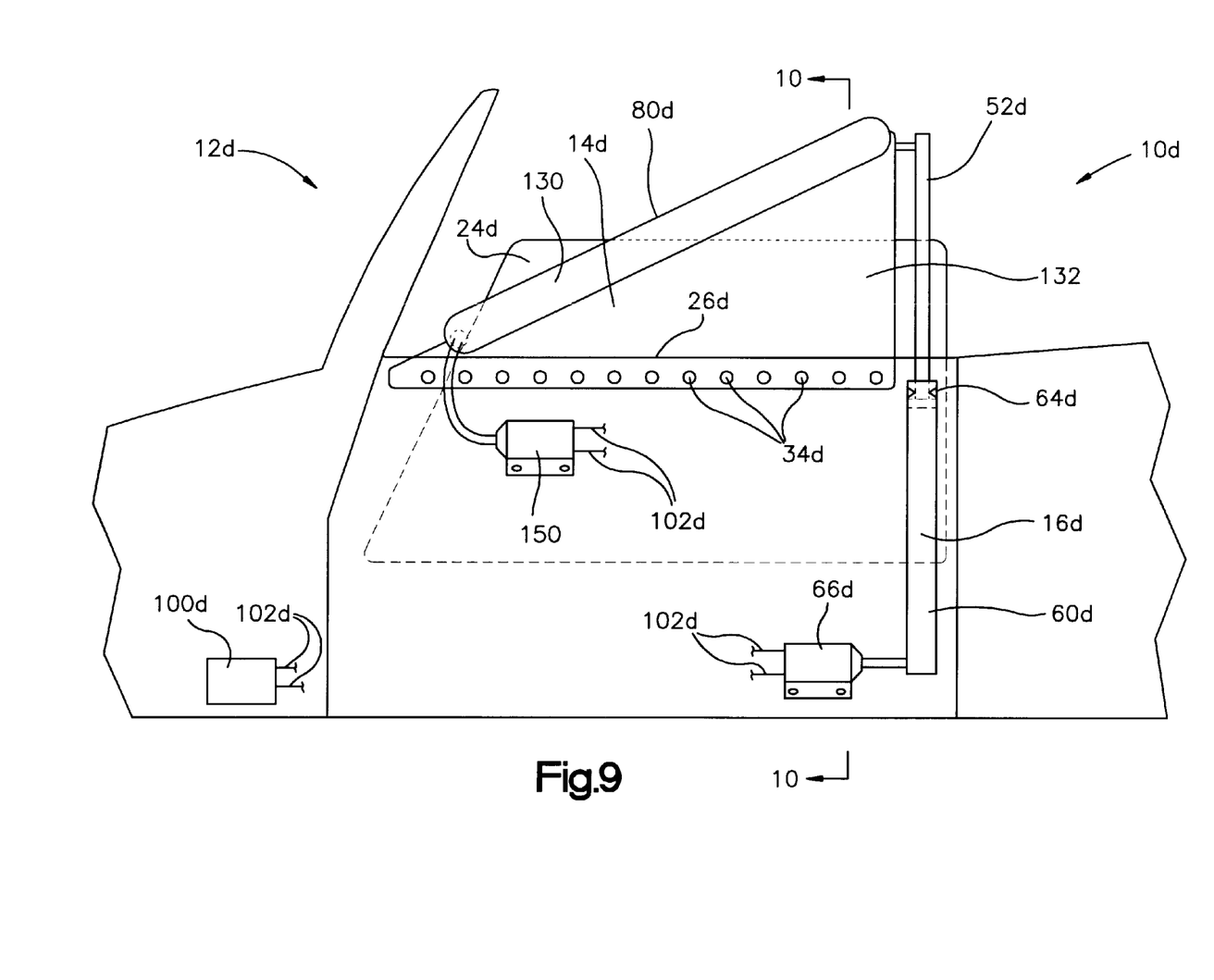
FIG. 9 is a schematic view of an apparatus for helping to protect a vehicle occupant illustrating the apparatus in a deployed condition, according to a third embodiment of the invention.
Figure 10:
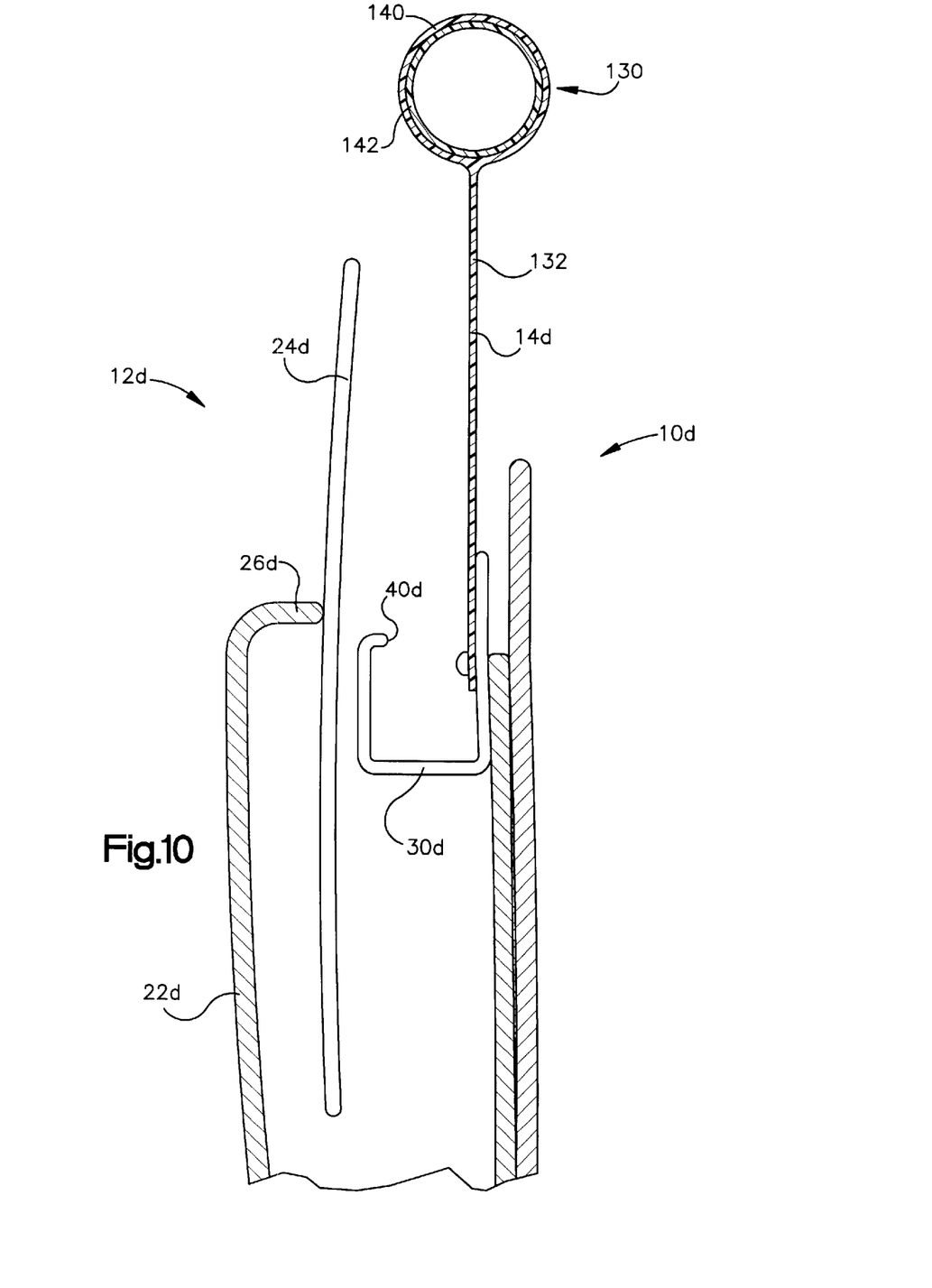
FIG. 10 is a sectional view of the apparatus taken generally along line 10—10 in FIG. 9.

A third embodiment of the present invention is illustrated in FIGS. 9 and 10. The third embodiment of the invention is similar to the first embodiment of the invention illustrated in FIGS. 1–4. Accordingly, numerals similar to those of FIGS. 1–4 will be utilized in FIGS. 9 and 10 to identify similar components, the suffix letter "d" being associated with the numerals of FIGS. 9 and 10 to avoid confusion. The apparatus 10d (FIGS. 9 and 10) of the third embodiment is identical to the apparatus 10 (FIGS. 1–4), except that the side curtain 14d (FIGS. 9 and 10) of the third embodiment has a different configuration than the side curtain 14 (FIGS. 1–4) of the first embodiment.

As illustrated in FIGS. 9 and 10, the side curtain 14d has a generally triangular configuration similar to the side curtain 14 (FIGS. 1–4) of the present invention. The side curtain 14d (FIGS. 9 and 10) could have an alternative shape or configuration. The side curtain 14d of the third embodiment comprises an inflatable portion in the form of an inflatable tubular structure 130 and a non-inflatable curtain portion 132. The inflatable tubular structure 130 extends along and helps define the upper edge 80d of the side curtain 14d. The curtain portion 132 is connected to the side door 22d adjacent the sill 26d by the fastening means 34d.

The curtain portion 132 (FIG. 9) has a construction similar to the side curtain 14 of the first embodiment (FIGS. 1–4). The curtain portion 132 (FIG. 9) is preferably constructed of a high-strength fabric, such as nylon, and may include a single or multiple layers of material. Alternative fabrics and other materials, such as elastomers, plastic films, or combinations thereof, may also be used to construct the curtain portion 132.

As best viewed in FIG. 10, the inflatable tubular structure 130 preferably includes a tubular outer shell 140 surrounding an inner bladder 142. Preferably, the outer shell 140 is constructed from a braided material. The inner bladder 142 is constructed of a gas impermeable material, such as rubber. Those skilled in the art, however, will recognize that the outer shell 140 and the inner bladder 142 may have alternative constructions.

The apparatus 10d of the third embodiment includes an inflation fluid source 150 for inflating the inflatable tubular structure 130. The inflation fluid source 150 contains a stored quantity of pressurized inflation fluid (not shown) in the form of a gas to inflate the inflatable tubular structure 130. The inflation fluid source 150 alternatively could contain a combination of pressurized inflation fluid and ignitable material for heating the inflation fluid, or could be a pyrotechnic inflator that uses the combustion of gas-generating material to generate inflation fluid. As a further alternative, the inflation fluid source 150 could be of any suitable type or construction for supplying a medium for inflating the inflatable tubular structure 130.

As illustrated in FIG. 9, the inflation fluid source 150 may be separate from the fluid source 66d. The inflation fluid source 150, however, could be combined with the fluid source 66d in a configuration similar to that of the second embodiment (FIGS. 7 and 8), and may thus provide pressurized fluid to the deployment device 16d and the inflatable tubular structure 130.

Upon sensing a side impact or a vehicle rollover for which deployment of the side curtain 14d is desired, the sensor mechanism 100d (FIG. 9) actuates the fluid source 66d and the inflation fluid source 150 by providing an electrical signal over the lead wires 102d. The fluid source 66d discharges pressurized fluid into the cylinder 60d to actuate the deployment device 16d. The inflation fluid source 150 discharges pressurized inflation fluid into the inflatable tubular structure 130 to inflate the tubular structure.

Upon actuation of the deployment device 16d, the deployment member 52d pulls on the side curtain 14d in the upward direction. Upon actuation of the inflation fluid source 150, the inflatable tubular structure 130 begins to inflate. As the inflatable tubular structure 130 inflates, the bladder 142 expands radially, which causes the outer shell 140 to expand radially. The braided fabric construction of the outer shell 140 causes the outer shell to contract lengthwise as the shell expands radially. The inflatable tubular structure 130 thus becomes tensioned between the deployment member 52d and the vehicle door 22d. Therefore, when the apparatus 10d is actuated, the side curtain 14d is urged in the upward direction as a result of the force applied to the curtain by the deployment member 52d and under the force applied to the curtain by the tensioned inflatable tubular structure 130. The housing 30d (FIG. 10) opens along the tear seam 40d under the force of the deploying side curtain 14d and the curtain is deployed in a generally upward direction into the position illustrated in FIGS. 9 and 10.

The side curtain 14d, when deployed, extends along the side door 22d of the vehicle 12d and is positioned between the side window 24d and any occupant (not shown) of the vehicle. As illustrated in FIGS. 9 and 10, when the side curtain 14d is in the deployed condition, the curtain extends generally vertically above the sill 26d.

The deployment member 52d, when deployed, extends upward in a generally vertical direction from the side door 22d. The deployment member 52d could, however, extend at an angle from the side door 22d. The locking means 64d locks the deployment member 52d in the deployed position of FIGS. 9 and 10. When the deployment member 52d is in the deployed position, the end of the deployment member connected to the side curtain 14d is positioned above the sill 26d.

The side curtain 14d, when deployed, helps to protect a vehicle occupant in the event of a vehicle rollover or a side impact to the vehicle 12d. The side curtain 14d, when deployed, helps to absorb the energy of impacts with the curtain and helps to distribute the impact energy over a large area of the curtain. The deployment member 52d, being locked in the deployed position by the locking means 64d, helps to maintain the side curtain 14d in the deployed position throughout the duration of a side impact to the vehicle 12d or a vehicle rollover. The rigid material construction of the deployment member 52d and the rigid connection between the deployment member and the vehicle 12d help provide rigid support for the side curtain 14d. This helps allow the side curtain 14d to absorb and distribute the impact energy.

The deployment member 52d, being locked in the deployed position by the locking means 64d, helps to maintain the side curtain 14d in the deployed position throughout the duration of a side impact to the vehicle 12d or a vehicle rollover.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure, said apparatus comprising:

a vehicle occupant protection device deployable from a stored position in which said vehicle occupant protection device is located in the side structure to a deployed position in which at least a portion of said vehicle occupant protection device is positioned above a sill of the side structure and adjacent a vehicle occupant;

a housing for storing said vehicle occupant protection device in said stored position, said housing being positioned in the side structure;

a plurality of fasteners, each of said fasteners connecting both said vehicle occupant protection device and said housing to the side structure, said fasteners connecting said housing and a lower edge of said vehicle occupant protection device to the side structure at a forward extent of said vehicle occupant protection device, at a rearward extent of said vehicle occupant protection device, and at least one location between the forward and rearward extents of said vehicle occupant protection device; and a deployment device fixedly connected to the side structure, said deployment device including an elongated rigid deployment member connected to said vehicle occupant protection device adjacent an upper edge of said vehicle occupant protection device, said deployment device being actuatable from a stored position in which said deployment member is positioned inside the side structure to a deployed position in which said deployment member projects above the sill of the side structure, said deployment member moving said vehicle occupant protection device from said stored position to said deployed position when said deployment device is actuated.

2. The apparatus as recited in claim 1, wherein said fasteners connect said vehicle occupant protection device and said housing to a door of the vehicle, all of the locations at which said fasteners connect said vehicle occupant protection device and said housing to the door being positioned below a sill of the door.

* * * * *